United States Patent [19]

Raven

[11] Patent Number: 4,866,523

[45] Date of Patent: Sep. 12, 1989

[54] VIDEO SIGNAL PROCESSING CIRCUIT PROVIDING NOISE SUPPRESSION WITH REDUCED SIGNAL DISTORTION

[75] Inventor: Johannes G. Raven, Eindhoven, Netherlands

[73] Assignee: U.S. Philips Corporation, New York, N.Y.

[21] Appl. No.: 228,862

[22] Filed: Aug. 4, 1988

Related U.S. Application Data

[63] Continuation of Ser. No. 94,050, Sep. 3, 1987, abandoned.

[30] Foreign Application Priority Data

Jul. 8, 1983 [NL] Netherlands .......................... 8302436

[51] Int. Cl.$^4$ ............................................. H04N 5/21
[52] U.S. Cl. ...................................... 358/167; 358/36
[58] Field of Search ................ 358/160, 167, 36, 905, 358/135; 455/296, 303, 304, 305, 306

[56] References Cited

U.S. PATENT DOCUMENTS 4,240,103 12/1980 Poetsch ................................. 358/167
4,393,396 7/1983 Raven .................................... 358/167

Primary Examiner—Tommy P. Chin
Attorney, Agent, or Firm—Edward W. Goodman

[57] ABSTRACT

In a video signal processing circuit comprising a complementary filter circuit (3), a subtracting circuit (27) is coupled to an input (1, 5, 33, 29) and to an output (9, 13, 25) of filter (7). The output (9) of the filter (7) is coupled, via a signal path which comprises a noise suppression circuit (43), to a combining circuit (55) which is further coupled to an output (37) of the substracting circuit (27). In order to compensate for the distortion occuring in the signal path via the noise suppression circuit (43) as a result of conversions (13, 49), the distortion in the signal path from the output (9) of the filter (7) to the subtracting circuit is made equal thereto by applying the same conversions (13, 21).

3 Claims, 1 Drawing Sheet

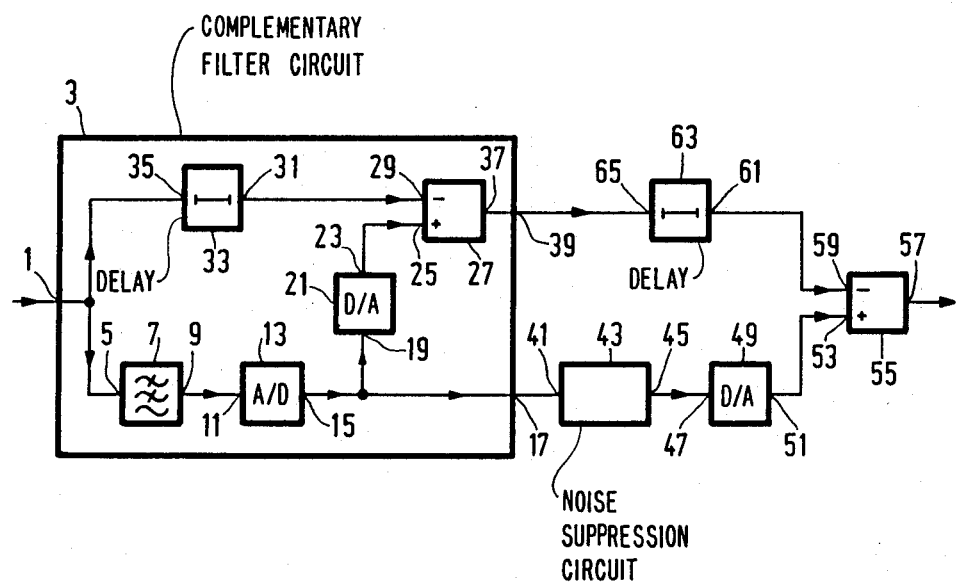

VIDEO SIGNAL PROCESSING CIRCUIT PROVIDING NOISE SUPPRESSION WITH REDUCED SIGNAL DISTORTION

This is a continuation of application Ser. No. 094,050, filed Sept. 3, 1987, now abandoned.

BACKGROUND OF THE INVENTION

The invention relates to a video signal processing circuit comprising, coupled to an input of the circuit, a complementary filter circuit, a first output of which is coupled to a first input of a combining circuit via at least a noise suppression circuit while a second output of the complementary filter circuit is coupled to a second input of the combining circuit, the complementary filter circuit comprising, coupled to one of its inputs, a filter and a subtracting circuit, a first input of the subtracting circuit being coupled to an output of the filter and a second input being coupled to the input of the complementary filter circuit and an output of the subtracting circuit being coupled to the second output of the complementary filter circuit whose first output is coupled to the output of the filter.

Netherlands patent application 8,004,696, corresponding to U.S. Pat. No. 4,393,396, discloses a video signal processing circuit of the above-mentioned type. In such a circuit it is often necessary to effect, in the signal path comprising the noise reduction circuit, a further processing of the video signal, such as, for example, an analog-to-digital conversion and a digital-to-analog conversion. Such conversions cause distortion of the signal conveyed through it. The invention has for its object to reduce the influence of these distortions on the output signal of the video signal processing circuit.

SUMMARY OF THE INVENTION

According to the invention, a video signal processing circuit of the type described in the opening paragraph is therefore characterized in that the signal paths from the output of the filter to the first input of the combining circuit and to the first input of the subtracting circuit include means for equalizing signal distortion in said path.

Owing to this measure, distortions conveyed to the combining circuit via the two signal paths occur therein in anti-phase, so that they have substantially no influence any more on the output signal of the combining circuit.

DESCRIPTION OF THE DRAWING

The invention will now be described in detail with reference to the accompanying drawing, which comprises only one FIGURE.

This FIGURE illustrates, by means of a block schematic circuit diagram, a video signal processing circuit according to the invention.

DESCRIPTION OF THE PREFERRED EMBODIMENT

In the FIGURE, a video signal is applied to an input 1 of the circuit, which input is, at the same time, the input of a complementary filter circuit 3.

The input 1 of the complementary filter circuit 3 is connected to an input 5 of a filter 7, which in this case is a low-pass filter.

An output 9 of the filter 7 is connected to an input 11 of a converter 13, an output 15 of which is connected to a first output 17 of the complementary filter circuit 3 and to an input 19 of a reconverter 21, an output 23 of which is connected to a first inut 25 of a subtracting circuit. A second input 29 of the subtracting circuit 27 is connected to an output 31 of a delay circuit 33, an input 35 of which is connected to the input 1 of the complementary filter circuit 3. An output 37 of the subtracting circuit 27 is connected to a second output 39 of the complementary filter circuit 3.

The first output 17 of the complementary filter circuit 3 is connected to an input 41 of a noise suppression circuit 43, an output 45 of which is connected to an input 47 of a further reconverter 49. An output 51 of the further reconverter 49 is connected to a first input 53 of a combining circuit 55 which, in this case is a subtracting circuit. An output 57 of the combining circuit 55 constitutes the output of the video signal processing circuit.

A second input 59 of the combining circuit 55 is connected to an output 61 of a delay circuit 63, an input 65 of which is connected to the second output 39 of the complementary filter circuit 3.

When the video signal at the input 1 of the complementary filter circuit 3 is an analog signal and the noise suppression circuit 43 is a digital circuit, the converter 13 is an analog-to-digital converter and the reconverters 21 and 49 are digital-to-analog converters.

If the video signal at the input 1 of the complementary circuit 3 is a digital signal then the converter 13 may be a sampling frequency converter. Then the reconverters 21 and 49 are sampling frequency restorers.

By incorporating the reconverter 21 between the output 15 of the converter 13 and the first input 25 of the subtracting circuit 27, the distortion in the signal paths from the output 9 of the filter 7 to the first input 53 of the combining circuit 55 is equal to the distortion in the signal path from the output 9 of the filter 7 to the first input 25 of the subtracting circuit 27. As the signal at this first input 25 of the subtracting circuit 27 is combined in anti-phase with the signal at the first input 53 of the combining circuit 55, the distortion caused by the converter 13 and the reconverter 49 is substantially eliminated at the output 57 of the combining circuit 55.

The time delay of the delay circuit 33 is chosen to be equal to the time delay of the series arrangement of the filter 7, the converter 13 and the reconverter 21. The time delay of the delay circuit 63 plus the time delay of the delay circuit 33 must be equal to the time delay of the series arrangement of the filter 7, the converter 13, the noise suppression circuit 43 and the reconverter 49.

If the noise suppression circuit 43 is a high-frequency noise suppression circuit, the filter 7 must be a high-pass filter.

If the inputs of the subtracting circuit 27 are interchanged then the combining circuit 55 must be an adder circuit.

What is claimed is:

1. A video signal processing circuit for suppressing noise components of a video signal received at an input terminal of said video signal processing circuit while minimizing distortion of said video signal due to noise suppression thereof, comprising:
  a frequency band separation circuit for dividing the input video signal into first and second complementary frequency bands thereof, said frequency band separation circuit comprising:
    filter means coupled to the input terminal of the video signal processing circuit for filtering the input video signal to derive a first signal corresponding to said first frequency band thereof;

converter means coupled to an output of said filter means for converting said first signal in accordance with a predetermined form of signal conversion, a converted first signal being produced at an output of said converter means and being applied to a first output of said frequency band separation circuit, said converted first signal including signal distortion due to said signal conversion;

first reconverter means coupled to the first output of said frequency band separation circuit for reconverting said converted first signal in accordance with an inverse of said predetermined form of signal conversion, a reconverted first signal produced at an output of said first reconverter means including said signal distortion due to said signal conversion and signal distortion due to said inverse signal conversion;

a signal subtraction circuit having a first input for receiving said reconverted first signal from said output of said first reconverter means and a second input coupled to the input terminal of said video signal processing circuit to receive said input video signal, said signal subtraction circuit subtractively combining the signals at its inputs to produce at a second output of said frequency band separation circuit a second signal corresponding to said second frequency band of the input video signal, such second signal including the signal distortions due to said signal conversion and a noise suppression circuit coupled to said first output of said frequency band separation circuit for processing the converted first signal produced thereat to suppress noise components therein;

second reconverter means coupled to an output of said noise suppression circuit for reconverting a noise-suppressed converted first signal produced at said output in accordance with said inverse of said predetermined form of signal conversion, a resulting reconverted noise-suppressed first signal produced at an output of said second reconverter means including signal distortion due to said signal conversion and signal distortion due to said inverse signal conversion, said signal distortions substantially matching the signal distortions in said second signal; and a signal combining circuit having a first input coupled to the output of said second reconverter means to receive said reconverted noise-suppressed first signal therefrom corresponding to said first frequency band, and a second input coupled to the second output of said separation circuit to receive said second signal corresponding to said second frequency band; said signal combining circuit subtractively combining the signals at its input terminals to produce at an output of said video signal processing circuit a signal which is a noise-suppressed replica of said input video signal and in which the signal distortions included, respectively, in said first and second signals due to said signal conversion and said inverse signal conversion of said first signal mutually cancel each other.

2. A video signal processing circuit as claimed in claim 1, wherein said predetermined form of signal conversion is analog-to-digital conversion, said inverse of said predetermined form of signal conversion is digital-to-analog conversion, said converter means is an analog-to-digital converter, and said first and second reconverter means are digital-to-aanalog converters.

3. A video signal processing circuit as claimed in claim 1, wherein said predetermined form of signal conversion is sampling frequency conversion, said converter means is a sampling frequency converter, and said first and second reconverter means are sampling frequency restorers.

* * * * *